US012578541B1

(12) United States Patent     (10) Patent No.: US 12,578,541 B1
Goodwin     (45) Date of Patent: Mar. 17, 2026

(54) RETENTION BRACKETS FOR FIBER OPTIC CABLES

(71) Applicant: FRONTIER COMMUNICATIONS HOLDINGS, LLC, Dallas, TX (US)

(72) Inventor: Seth M. Goodwin, Lafayette, IN (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 19/229,374

(22) Filed: Jun. 5, 2025

(51) Int. Cl.
G02B 6/00      (2006.01)
G02B 6/44      (2006.01)

(52) U.S. Cl.
CPC .................................. G02B 6/4446 (2013.01)

(58) Field of Classification Search
CPC ................................ G02B 6/4446; G02B 6/00
See application file for complete search history.

(56) References Cited

U.S. PATENT DOCUMENTS

| | | | |
|---|---|---|---|
| 5,613,030 A * | 3/1997 | Hoffer ................ | G02B 6/44526 385/135 |
| 10,466,434 B2 * | 11/2019 | Kaplan .............. | G02B 6/44528 |
| 11,892,696 B2 * | 2/2024 | Geens ................. | G02B 6/3897 |
| 2025/0047086 A1 * | 2/2025 | Henderson ............ | H02G 3/086 |

* cited by examiner

*Primary Examiner* — Jennifer Doan
(74) *Attorney, Agent, or Firm* — MARSHALL, GERSTEIN & BORUN LLP

(57)     ABSTRACT

An enclosure for retaining a multi-core fiber cable includes a shell defining an interior volume and featuring an upper retention member forming a channel. A retention bracket is at least partially disposed within the shell and includes a base panel with a front surface and rear surface. The rear surface features an upper hook member adapted to engage the upper retention member for slidably coupling the retention bracket with the shell, while the front surface includes a guide wall to accommodate a length of individual fiber strands along the surface. A floor panel extends from the base panel and includes openings dimensioned to individually receive the strands of fiber cable.

18 Claims, 11 Drawing Sheets

RETENTION BRACKETS FOR FIBER OPTIC CABLES

FIELD OF THE DISCLOSURE

This disclosure relates generally to networking systems, and, more particularly, to retention brackets for fiber optic cables.

BACKGROUND

Multi-dwelling units (MDUs) often employ complex fiber optic installations to deliver reliable internet and communication services to multiple residences within a single building. Conventional outdoor fiber optic enclosures typically involve accommodating a single fiber connection through an adapter, limiting the number of possible fiber drops. Such configurations can lead to significant challenges to installer efficiency, aesthetic design on the building, and reliable long-term operation. Multiple slack boxes or individual drop points are often required, which increases hardware clutter and installation complexity in smaller-scale MDU configurations. These issues can result in an untidy appearance, extended setup times, and greater difficulty in maintenance efforts.

In certain scenarios, such as aerial-to-buried fiber installations and side-by-side duplex housing environments, existing enclosures and terminals may not sufficiently support extending fiber coverage to multiple residences effectively. Conventional equipment often lacks mechanisms for secure organization of multi-stranded fiber cables, fails to optimize for proper fiber bend radius considerations, and may not provide adequate retention for individual fiber strands. As a result, fiber cables may be prone to unnecessary stress, mismanagement, or potential damage during installation or routine maintenance. The absence of properly designed retention approaches in conventional systems further exacerbates these concerns.

There is also limited flexibility and adaptability in conventional enclosures. For example, accommodating both single-strand fiber connections and multi-stranded fiber drops within the same housing often requires entirely separate hardware or retrofits that are burdensome for installers and increase costs. Additionally, previous designs often lack features to integrate or securely mount fiber adapters, within the enclosure, leading to loose or unsecured connections that can hinder performance or otherwise incur damage.

Accordingly, there is a need for improved devices having improved functionalities.

SUMMARY

In accordance with a first aspect, an enclosure for retaining a multi-core fiber cable having a plurality of individual strands of fiber cable includes: (1) a shell defining an interior volume, the shell including an upper retention member forming a channel; (2) a retention bracket adapted to be at least partially disposed within the interior volume of the shell; where the retention bracket includes: (3) a base panel having a front surface and a rear surface, where the rear surface includes an upper hook member adapted to engage the upper retention member of the shell to slidably couple the retention bracket with the shell, and where the front surface includes a first guide wall adapted to accommodate a length of the plurality of individual strands of fiber cable along said surface; and (4) a floor panel extending from the base panel, where the floor panel includes a plurality of openings, each opening dimensioned to individually receive one of the plurality of individual strands of fiber cable.

In some examples, the shell may further include a lower retention member forming a channel. Additionally, the base panel of the retention bracket can include a lower hook member adapted to slidably engage the lower retention member of the shell to couple the retention bracket therewith.

In these and other forms, the shell can further include an inlet dimensioned to accommodate the multi-core fiber cable. Further, the shell can include a plurality of outlets, where each of the outlets can be dimensioned to accommodate one of the plurality of individual strands of fiber cable.

In some approaches, the first guide wall may include a curved contact surface adapted to contact the length of the plurality of individual strands of fiber cable.

Additionally, the apparatus may further include a ledge operably coupled with the first guide wall, where the ledge can cooperate with the front surface of the base panel to define a channel.

In some forms, the front surface of the base panel may further include a second guide wall spaced apart from the first guide wall, where the plurality of individual strands of fiber cable may be wrapped around the first guide wall and the second guide wall. Further, the first guide wall and second guide wall can be spaced apart from each other to define a slack storage ring. Additionally, the slack storage ring may have a minimum bend radius of greater than approximately 3".

In some examples, each of the openings may be dimensioned to receive a connector adapted to couple each individual strand of fiber cable with a single strand fiber cable.

Further, the base panel of the retention bracket can include at least one pass-through adapted to receive a retention member, which can secure the individual strands of fiber cable. Additionally, the shell can further include a guide member adapted to receive a portion of the multi-core fiber cable.

In some forms, the upper hook member of the base panel can include a stop member adapted to limit lateral movement of the retention bracket relative to the upper retention member.

In accordance with a second aspect, a retention bracket for use in an enclosure for retaining a multi-core fiber cable having a plurality of individual fiber strands may include: (1) a base panel having a front surface and a rear surface, the rear surface including an upper hook member adapted to slidably engage a corresponding complementary component of a fiber cable enclosure; (2) a first guide wall positioned on the front surface of the base panel, the first guide wall adapted to accommodate a length of the plurality of individual fiber strands routed therealong; (3) and a floor panel extending outwardly from the base panel, the floor panel including a plurality of openings, each opening dimensioned to individually receive one of the plurality of individual fiber strands therethrough.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
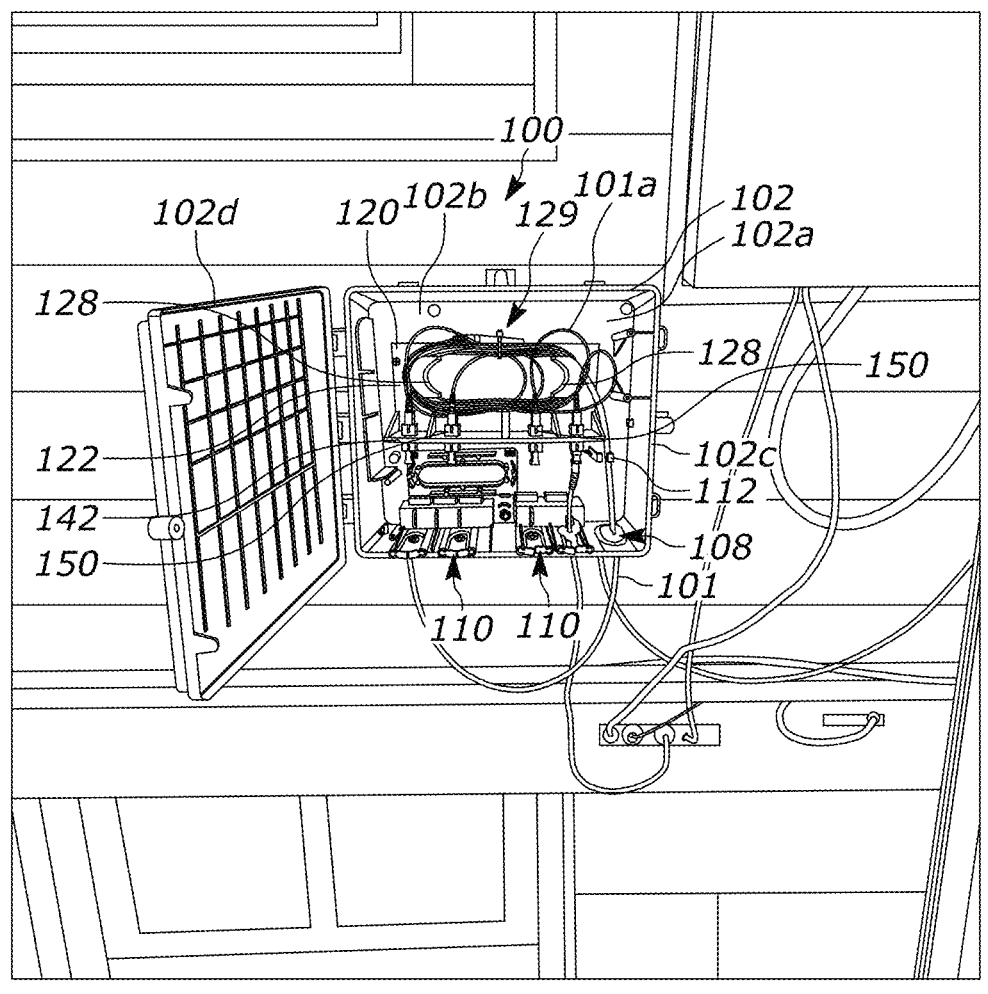

FIG. 1 is a perspective view of an example enclosure having an example retention bracket for retaining a multi-core fiber cable in which the systems, methods, and/or techniques of the present disclosure may be implemented.

Figure 2:
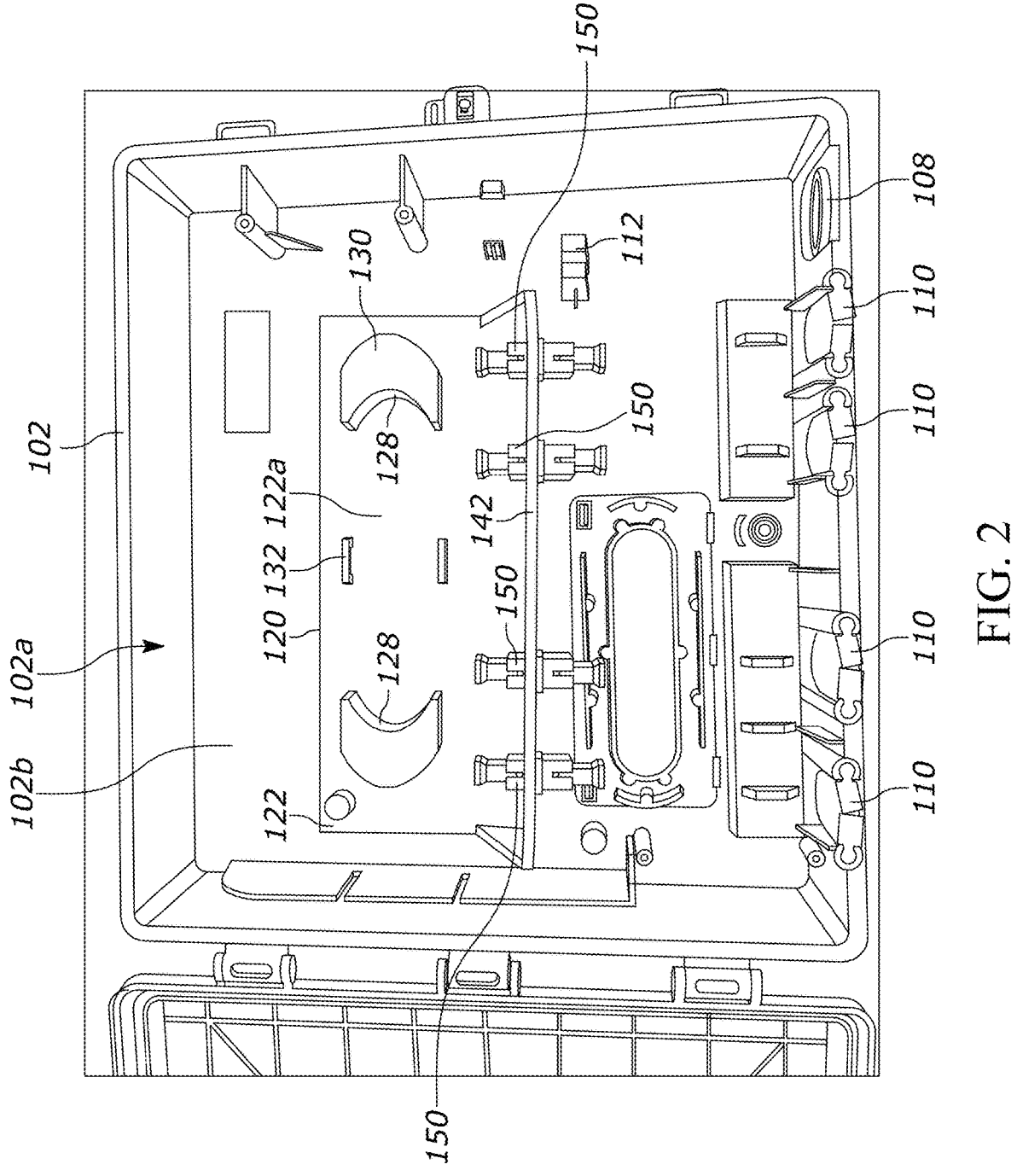

FIG. 2 is a perspective view of the example enclosure and example retention bracket of FIG. 1 in accordance with various examples.

Figure 3:
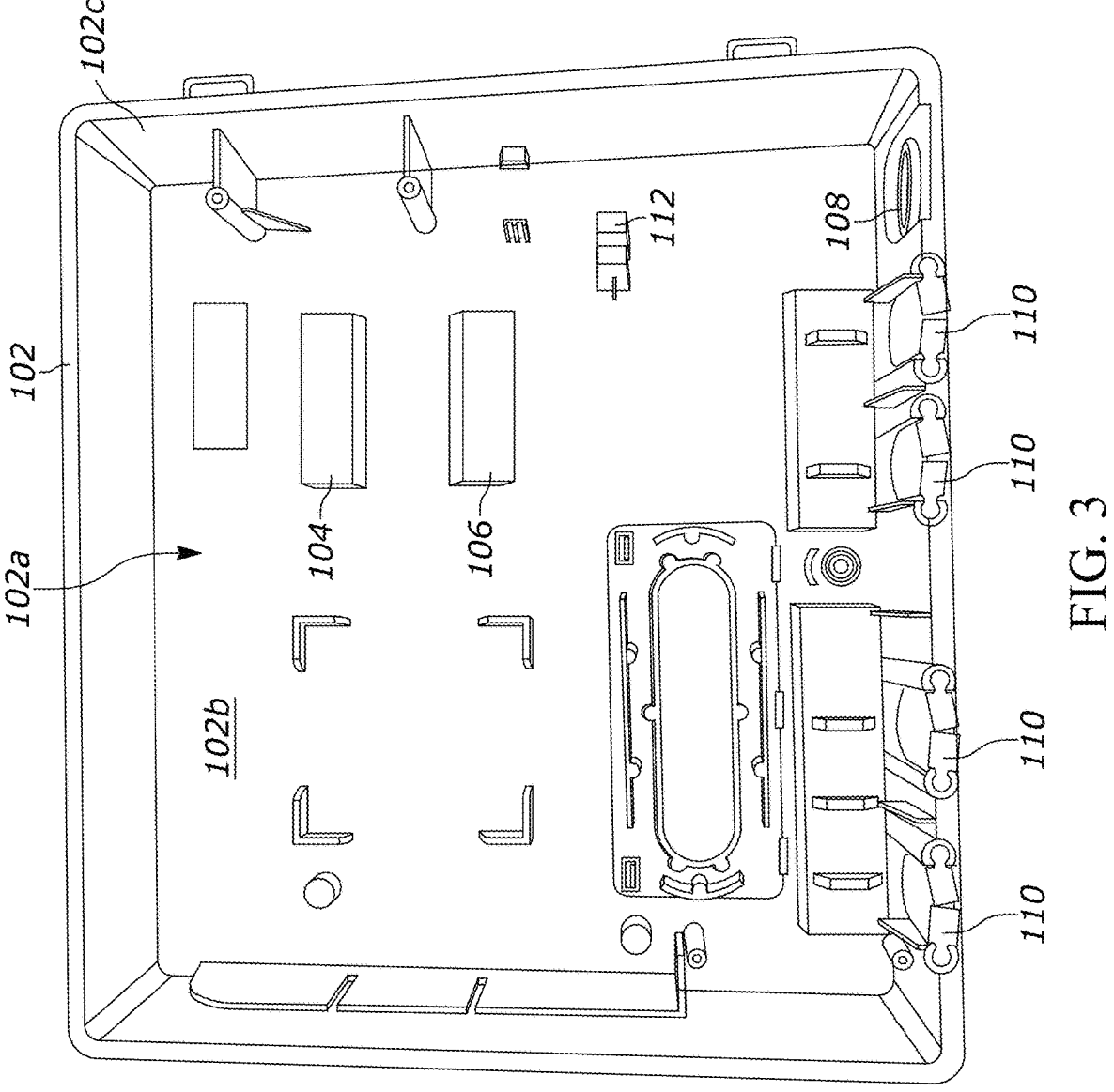

FIG. 3 is a perspective view of the example enclosure of FIGS. 1 & 2 in accordance with various examples.

Figure 4:
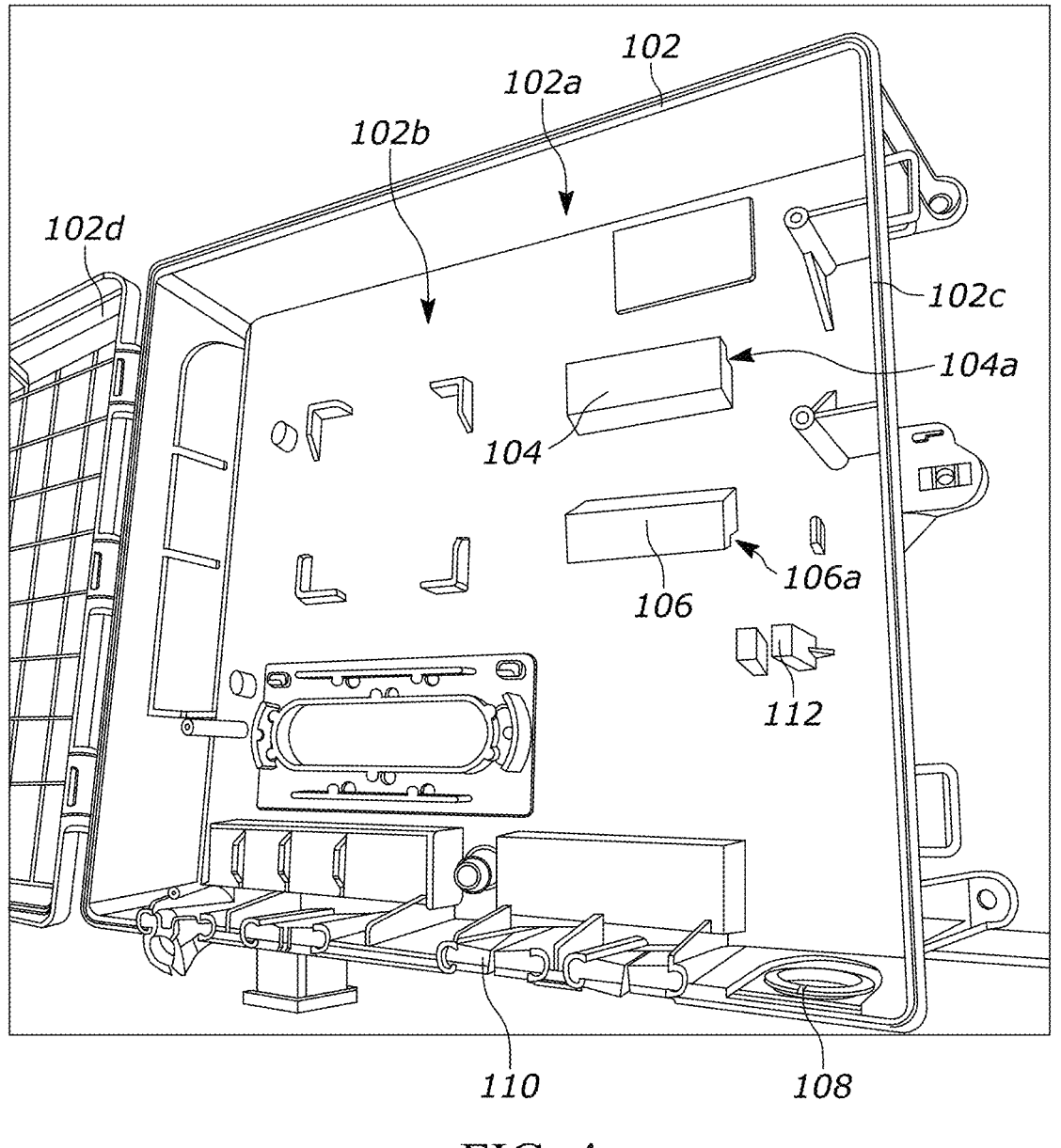

FIG. 4 is a side perspective view of the example enclosure of FIGS. 1-3 in accordance with various examples.

Figure 5:
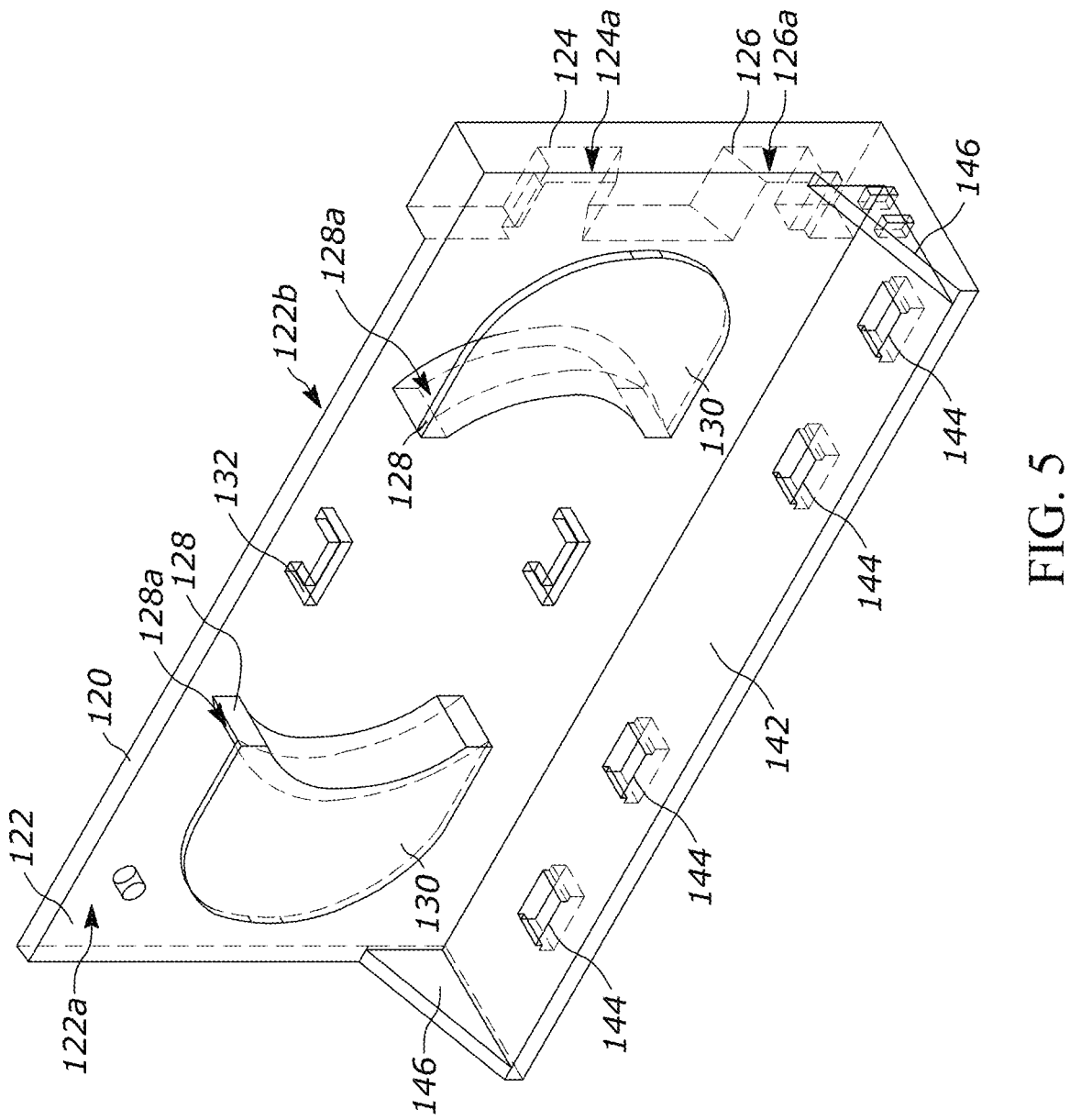

FIG. 5 is a perspective view of a first example retention bracket for use with the enclosure of FIGS. 1-4 in accordance with various examples.

Figure 6:
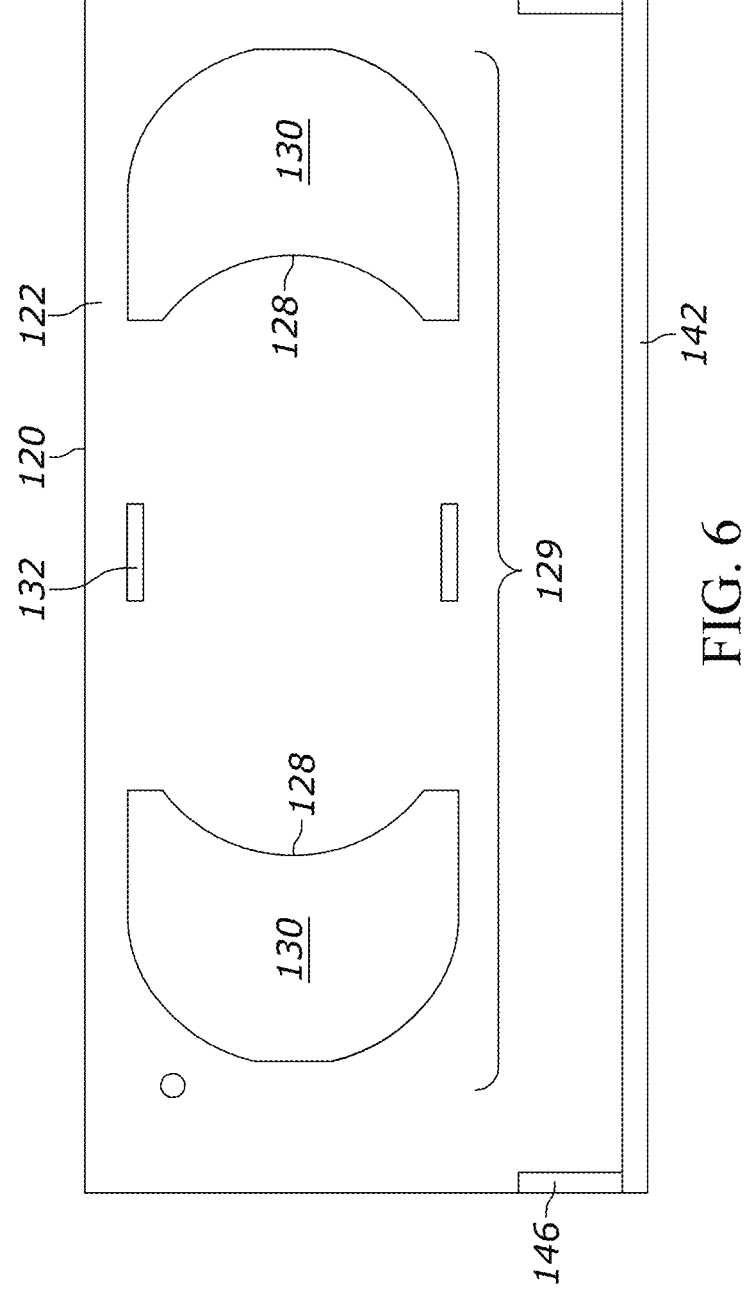

FIG. 6 is a front elevation view of the example retention bracket of FIG. 5 in accordance with various examples.

Figure 7:
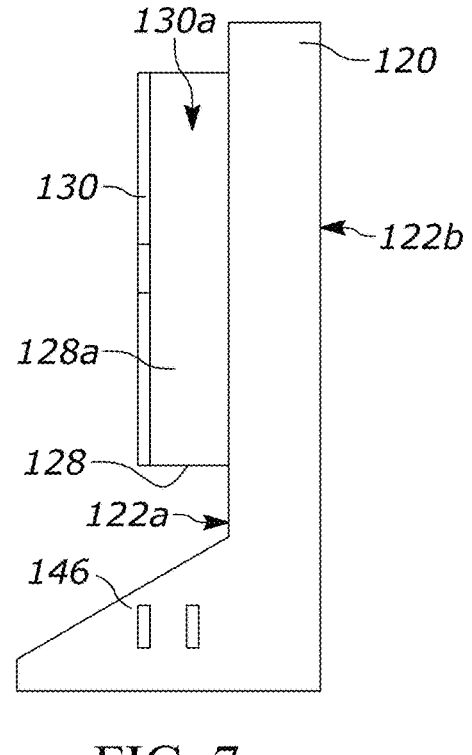

FIG. 7 is a side elevation view of the example retention bracket of FIGS. 5 & 6 in accordance with various examples.

Figure 8:
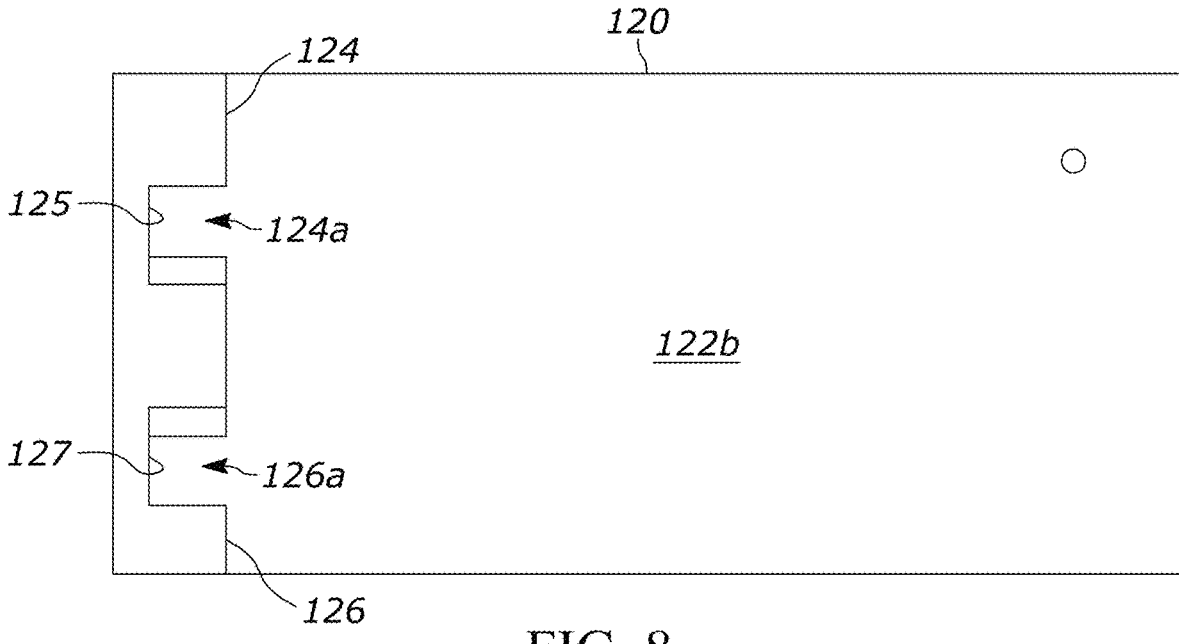

FIG. 8 is a rear elevation view of the example retention bracket of FIGS. 5-7 in accordance with various examples.

Figure 9:
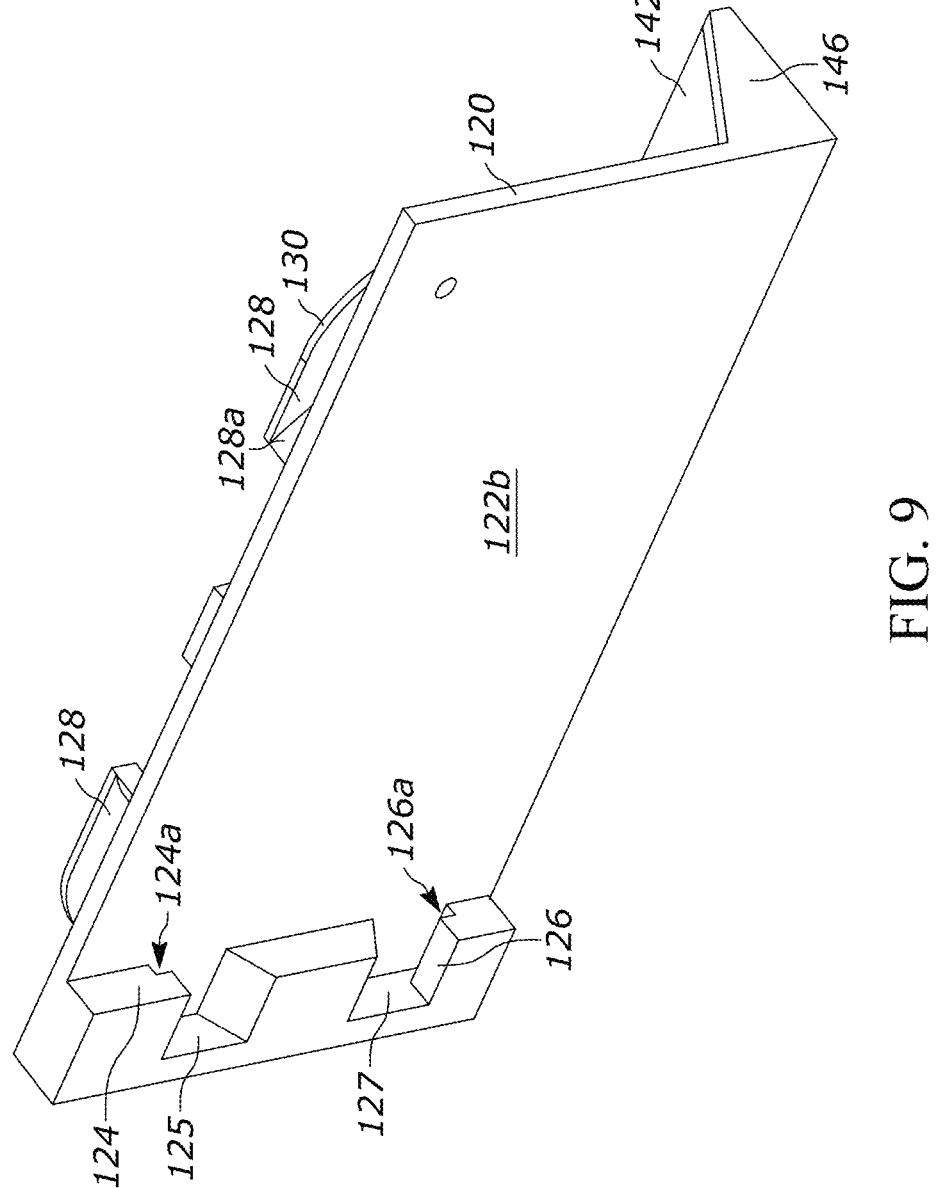

FIG. 9 is a rear perspective view of the example retention bracket of FIGS. 5-8 in accordance with various examples.

Figure 10:
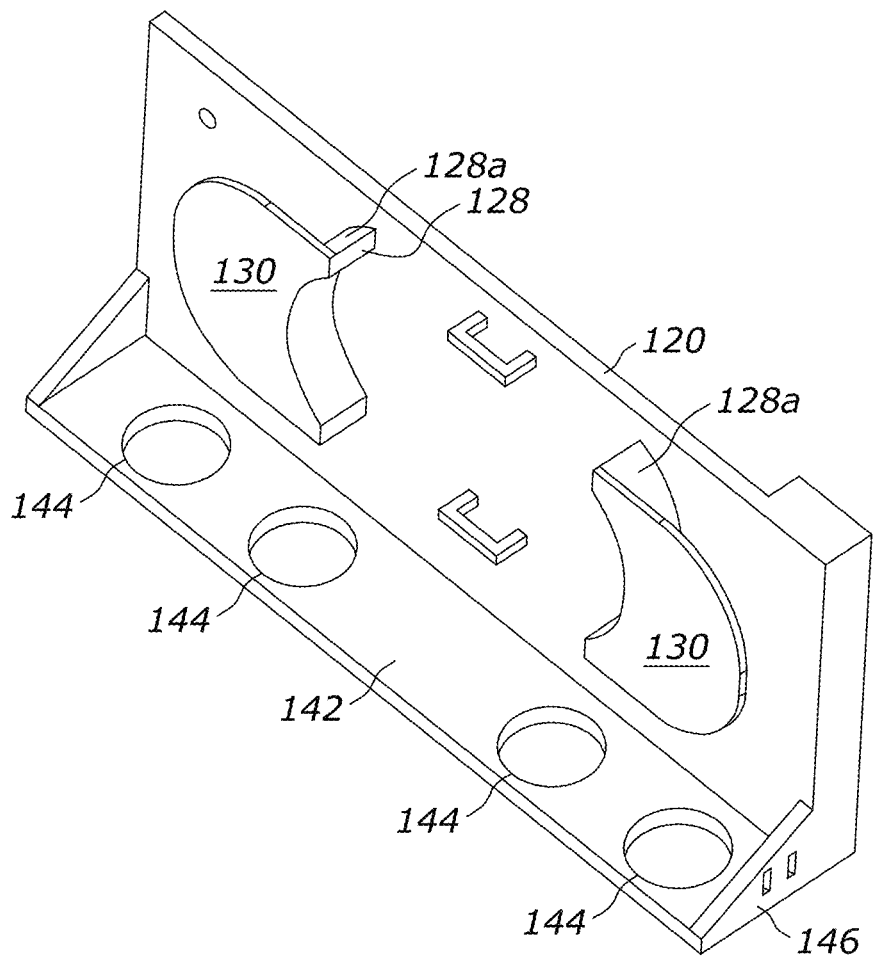

FIG. 10 is a perspective view of a second example retention bracket for use with the enclosure of FIGS. 1-4 in accordance with various examples.

Figure 11:
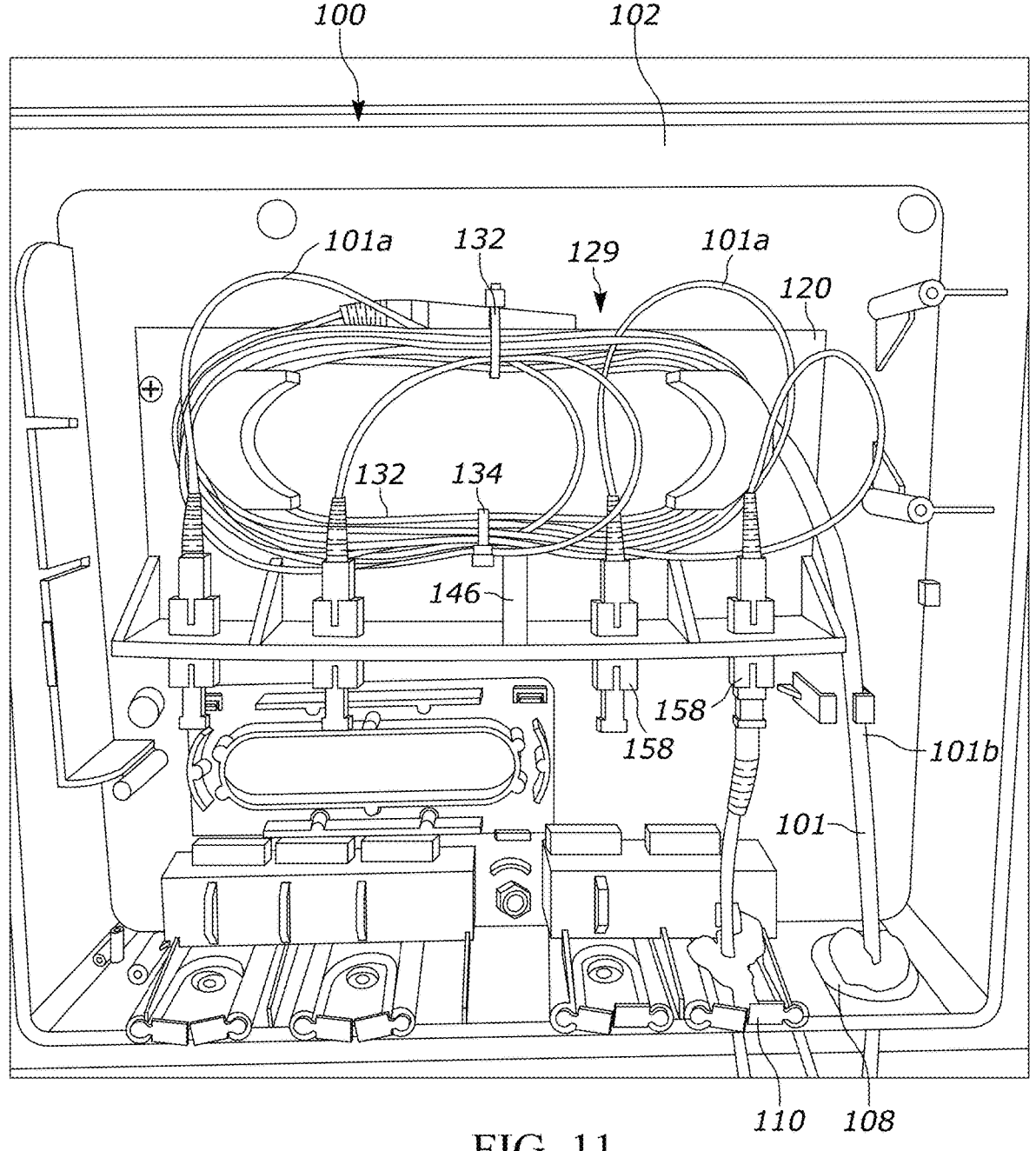

FIG. 11 is a perspective view of the example enclosure of FIGS. 1-10 having the example retention bracket and multi-core fiber cable operably coupled therewith in accordance with various examples.

Figure 12:
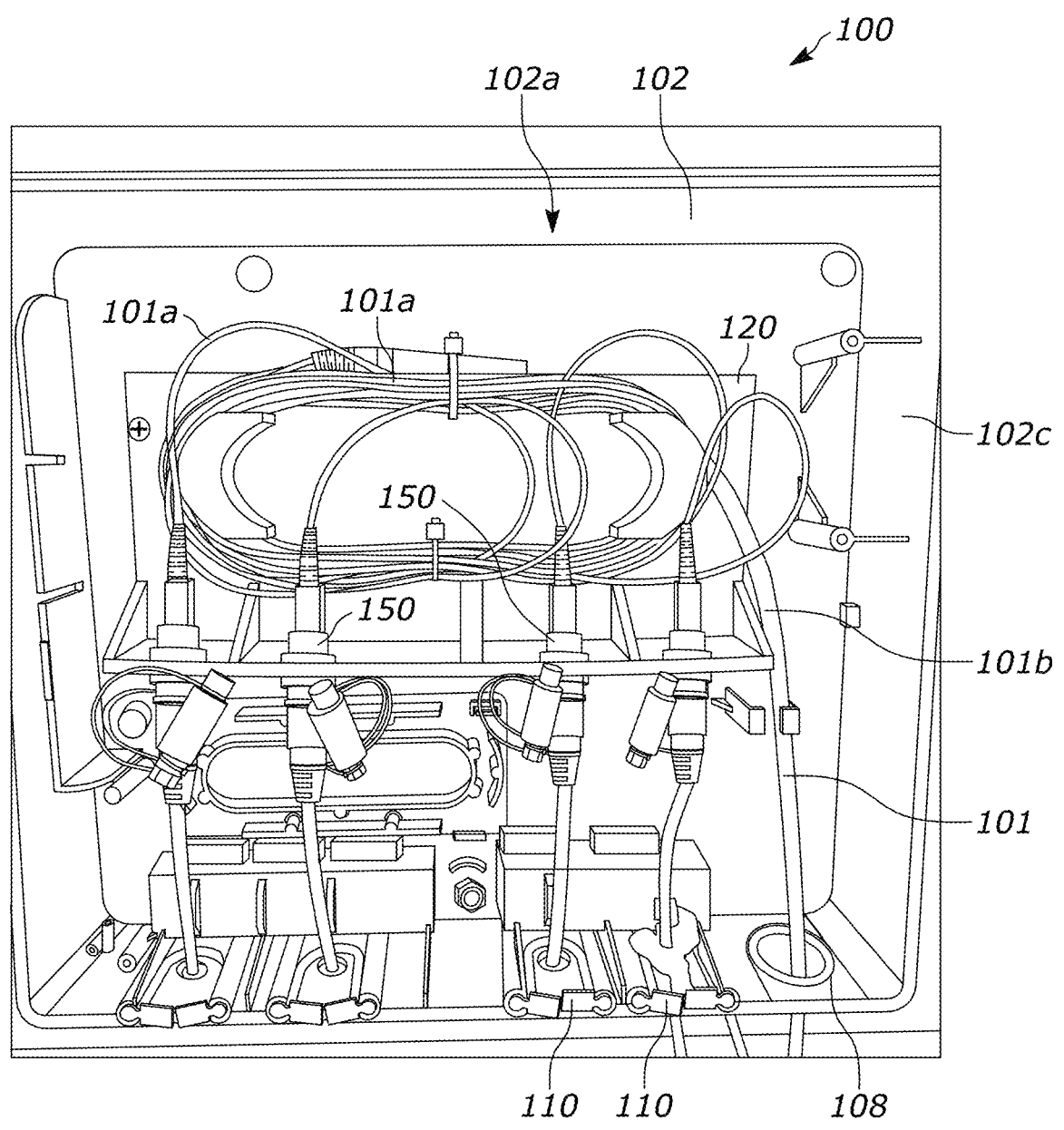

FIG. 12 is a perspective view of the example enclosure of FIGS. 1-10 having the example retention bracket and multi-core fiber cable operably coupled therewith while including a second example connector in accordance with various examples.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for securing and retaining components of passive optical networks (PONs). Generally speaking, a component of a PON, as utilized herein, may be in the form of a multi-core fiber optic cable to transmit data to and from a building having multiple users (e.g., a multi-dwelling unit or "MDU"). Such a component may be securely retained within an enclosure using new retention brackets described herein without the need for modifications to the enclosure. Further, in some examples, the retention brackets described herein may eliminate the need for additional securing mechanisms.

Turning now to the Figures, an enclosure 100 is provided for retaining at least one networking component such as, for example, a multi-core fiber cable 101. The enclosure 100 may include a shell 102 defining an interior volume 102*a* and a retention bracket 120. More specifically, the illustrated shell 102 of the enclosure 100 includes a rear panel 102*b*, a number of sidewalls 102*c*, and a door 102*d*. While the illustrated enclosure 100 is in the form of a generally rectangular box, it is to be appreciated that the enclosure 100 may take any number of suitable shapes, forms, and/or configurations.

An upper retention member 104 is coupled with (i.e., attached therewith) or otherwise formed on the rear panel 102*b* of the shell 102. More specifically, the upper retention member 104 is in the form of a ledge extending along a length of the rear panel 102*b*. The upper retention member 104 and the rear panel 102*b* cooperate to form a channel 104*a*. In the illustrated example, the upper retention member 104 has an open upper portion, while the lower portion thereof is operably coupled with the rear panel 102*b* of the shell 102. However, it is to be appreciated that in other examples (not illustrated), an opposite configuration may be provided.

In some examples, a lower retention member 106 is also coupled with (i.e., attached therewith) or otherwise formed on the rear panel 102*b* of the shell 102. The lower retention member 106 may also be in the form of a ledge extending along a length of the rear panel 102*b*. The lower retention member 106 and the rear panel 102*b* cooperate to form a channel 106*a*. In the illustrated example, the lower retention member 106 has an open lower portion, while the upper portion thereof is operably coupled with the rear panel 102*b* of the shell 102. However, it is to be appreciated that in other examples (not illustrated), an opposite configuration may be provided.

It is further to be appreciated that in some examples, the upper retention member 104 (and, in examples where a lower retention member 106 is provided) may be coupled with or otherwise formed on any one of the sidewalls 102*c* and/or the door 102*d* of the shell 102.

The shell 102 further includes at least one inlet 108 along with any number of outlets 110. More specifically, the inlet 108 is dimensioned to accommodate a multi-core fiber cable 101 that contains any number of individual strands of fiber cable 101*a* sounded by a sheath or jacket 101*b*. In some approaches, the multi-core fiber cable 101 may include four individual strands of fiber cable 101*a*. In yet other examples, eight, 16, 32, 64, 128, or any other number of individual strands of fiber cable 101*a* may be provided within the multi-core fiber cable 101. Each of the outlets 110 may be dimensioned to accommodate an individual strand of fiber cable 101*a*. As such, it is to be appreciated that the enclosure 100 may include a number of outlets 110 that corresponds with the number of individual strands of fiber cable 101*a*.

The retention bracket 120 may be at least partially disposed and/or otherwise positionable within the interior volume 102*a* of the shell 102. The retention bracket 120 includes a base panel 122 having a front surface 122*a* and a rear surface 122*b*. The retention bracket 120 may be constructed from any number of suitable materials such as, for example, polymeric materials, metals, and the like. Other examples are possible.

Generally speaking, the base panel 122 is adapted to slidably couple with the shell 102. The base panel 122 includes an upper hook member 124 extending and/or protruding away from the rear surface 122*b* of the base panel 122 and extending along a length thereof. In some examples, the upper hook member 124 may be integrally formed with the base panel 122. In yet other examples, the upper hook member 124 may be operably coupled with the base panel 122 via any number of suitable approaches. The upper hook member 124 and the base panel 122 cooperate to form an upper hook channel 124*a*. In the illustrated example, the upper hook member 124 has an open lower portion, while the upper portion thereof is operably coupled with the base panel 122 of the retention bracket 120. However, it is to be appreciated that in other examples (not illustrated), an opposite configuration may be provided.

In some examples, the base panel 122 may also include a lower hook member 126 extending and/or protruding away from the rear surface 122*a* of the base panel 122 and extending along a length thereof. In some examples, the lower hook member 126 may be integrally formed with the base panel 122. In yet other examples, the lower hook member 126 may be operably coupled with the base panel 122 via any number of suitable approaches. The lower hook member 126 and the base panel 122 cooperate to form a lower hook channel 126*a*. In the illustrated example, the lower hook member 126 has an open upper portion, while the lower portion thereof is operably coupled with the base panel 122 of the retention bracket 120. However, it is to be appreciated that in other examples (not illustrated), an opposite configuration may be provided.

The enclosure 100 may include any number of guide walls 128 operably coupled with the front surface 122*a* of the base panel 122. In some examples, the guide wall(s) 128 may be integrally formed with the base panel 122. Other arrangements are possible. In the illustrated example, two guide walls 128 are provided. As will be discussed in further detail herein, the guide walls 128 cooperate to define a slack storage ring 129.

Each of the guide walls 128 includes a curved contact surface 128*a*. The curved contact surface 128*a* may have any desired curvature such as, for example, a radius of approximately 3 inches. It is to be appreciated that the radius may be greater than or less than this value in certain implementations. Further, the two guide walls 128 may be arranged such that their respective curved contact surfaces 128*a* face away from each other. In such an arrangement, the slack storage ring 129 formed by the two guide walls 128 may take the form of an oval or other elongated curved shape. In some examples, the two guide walls 128 may be spaced apart from each other approximately three inches, therefore providing a total value of greater than approximately six inches. Such dimensions may provide for effective retention of the individual strands of fiber cable 101*a* when loosely wrapped around the guide walls 128 (i.e., when not under tension) in addition to when the individual strands of fiber cable 101*a* are tightly wound around the guide walls 128. Other examples are possible.

A ledge 130 may be disposed at a distal end of the guide wall 128. In the illustrated examples, the ledge 130 is in the form of a generally planar surface that is generally parallel to the front surface 122*a* of the base panel 122. So arranged, the front surface 122*a* of the base panel 122 and the ledge 130 cooperate to define a channel 130*a*, which, as will be discussed, may receive all or a portion of the multi-core fiber cable 101.

The retention bracket 120 further includes a floor panel 142 that extends outwardly from the base panel 122. In some examples, the floor panel 142 and the base panel 122 are integrally formed, and in other examples, the floor panel 142 may be operably coupled with the base panel 122 via any number of suitable approaches. The floor panel 142 includes a number of openings 144 and support arms or buttresses 146. Each of the openings 144 is dimensioned to receive a connector 150 which is provided to connect the individual strands of fiber cable 101*a* with additional cabling at the outlet 110 of the enclosure 100.

As previously noted, the multi-core fiber cable 101 includes a plurality of individual strands of fiber cable 101*a*. In use of the enclosure 100, the multi-core fiber cable 101 enters the enclosure 100 via the inlet 108, and the sheath 101*b* terminates within the interior volume 102*a* of the shell 102, whereupon the individual strands of fiber cable 101*a* are exposed. These individual strands of fiber cable 101*a* are then wrapped around the curved contact surface 128*a* of each guide wall 128, thus defining the slack storage ring 129. It is to be appreciated that in some arrangements, it may be desirable to merely loosely wrap the individual strands of fiber cable 101*a* so as to limit or otherwise minimize strain thereto. The terminating end of the individual strands of fiber cable 101*a* are then coupled with respective connectors 150 that are coupled with each respective opening 144 of the floor panel 142.

The connector 150 is provided as an intermediate connection between the individual strands of fiber cable 101*a* and the desired outlet cable. In some examples, the connector 150 may be in the form of a bulkhead having first and second openings and/or retaining elements to secure the desired cable therein. Each opening may receive a respective individual strand of fiber cable 101*a* and the desired outlet cable. The connector 150 may be disposed within the outlet 110 via any number of suitable approaches such as, for example, via a friction fit coupling. In some examples, the connector 150 may have retention features such as deformable or otherwise resilient tabs, notches, protrusions, and the like that engage the outlet 110.

With reference to FIGS. 5 & 11, a retention bracket 120 is provided that includes openings 144 dimensioned and arranged to receive a first example connector 150. In this example, the connector 150 is in the form of a fiber APC connector. With reference to FIGS. 10 & 12, an alternative retention bracket 120 is provided having openings 144 dimensioned and arranged to receive a second example connector 150. In this example, the connector 150 is in the form of an Opti-Tap connector used as an extension of singular fiber installation drops, for example, when it is desired to extend a terminal location as opposed to a singular drop. It is to be appreciated that other examples of suitable connectors 150 may be provided. In any of these examples, the opposite end of the desired outlet cable connects to a subsequent device (e.g., a subsequent terminal or a residential drop.

Prior to or after wrapping the individual strands of fiber cable 101*a* around the guide walls 128, the retention bracket 120 may be coupled with the shell 102. More specifically, in some examples, the channel 104*a* formed by the rear panel 102*b* and the upper retention member 104 may be dimensioned to receive the upper hook member 124. Further, the upper hook channel 124*a* formed by the upper hook member 124 and the rear surface 122*a* of the base panel 122 may be dimensioned to receive the upper retention member 104. So arranged, the upper retention member 104 may mate or otherwise nest with the upper hook member 124.

Similarly, in examples where the lower retention member 106 and the lower hook member 126 are provided, the channel 106*a* formed by the rear panel 102*b* and the lower retention member 106 may be dimensioned to receive the lower hook member 126. Further, the lower hook channel 126*a* formed by the lower hook member 126 and the rear surface 122*a* of the base panel 122 may be dimensioned to receive the lower retention member 106. So arranged, the lower retention member 106 may also mate or otherwise nest with the lower hook member 126.

The retention bracket 120 (along with the multi-core fiber cable 101, if previously coupled therewith) may be coupled with the shell 102 of the enclosure 100 using a number of approaches. In a first example, the retention bracket 120 may be positioned so that the upper hook member 124 is disposed above the upper retention member 104. The retention bracket 120 may then be lowered such that the upper hook member 124 mates with the upper retention member 104, thereby allowing the upper hook member 124 to be slidably disposed within the channel 104*a*. It is to be appreciated that such a coupling may not be preferrable in examples where the lower hook member 126 and the lower retention member 106 are provided.

In a second example, the retention bracket 120 may be positioned to the side of the upper retention member 104 (and the lower retention member 106, if provided). The upper hook member 124 of the retention bracket 120 may then slidably engage the upper retention member 104 (and the lower hook member 126 may similarly slidably engage the lower retention member 106, if provided) by moving the retention bracket 120 in a generally horizontal or lateral direction relative to the shell 102 such that the upper hook member 124 is disposed within the channel 104*a* and the upper retention member 104 is disposed within the upper hook channel 124*a*.

In some approaches, the upper hook member 124 may include a stop member 125 that prevents or otherwise limits lateral movement of the retention bracket 120 past a certain point with respect to the upper retention member 104. As such, the stop member 125 may prevent the retention bracket 120 (and thus, the networking component 10 coupled therewith) from decoupling from the shell 102. As before, in examples where the lower hook member 126 is provided, a stop member 127 may also be included thereon to additionally prevent or otherwise limit lateral movement of the retention bracket 120.

As such, the retention bracket 120 may be used with existing shells 102 without needing to make modifications thereto. Put differently, the retention bracket 120 may be provided as a retrofittable component.

So arranged, the spacing between the two guide walls 128 may result in the individual strands of fiber cable 101*a* having a relatively high bend radius while being securely retained within the shell 102. It is to be appreciated that in some examples, additional features may be provided to further secure and/or otherwise retain the multi-core fiber cable 101 (and/or the individual strands of fiber cable 101*a*) within the shell 102, providing protection against cable damage or movement that could disrupt fiber connections. For example, as illustrated in FIG. 5, a pass through 132 is provided to receive a retention member 134 that may be used to secure the individual strands of fiber cable 101*a*. Further, as shown in FIGS. 1-3, the shell 102 may include a guide member 112 provided to retain the multi-core fiber cable 101. In this example, the guide member is in the form of two inwardly-facing fingers having a gap therebetween to receive a portion of the multi-core fiber cable 101.

Further still, in some examples, the base panel 122 of the retention bracket 120 may include any number of chamfered or otherwise angled surfaces that may slidably engage a corresponding chamfered or otherwise angled surface carried by the upper retention member 104 and/or the rear panel 102*b* of the shell 102. Such a configuration may provide for better alignment and positioning of the retention bracket 120 relative to the shell 102.

The retention brackets provided herein are designed to support the fiber strands and maintain appropriate spacing, which ensures the bend radius of the fiber strands complies with specifications, preventing signal degradation or fiber breakage. The smooth curved walls promote efficient routing and organization of fiber strands within the enclosure, while minimizing wear and tear. Additionally, retention points act as barriers to prevent fiber strands from spilling out or expanding beyond designated areas, maintaining structural integrity and ensuring operational reliability.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Numerous alternative examples could be implemented, using either current technology or technology developed after the filing date of this patent, which would still fall within the scope of the claims. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An enclosure for retaining a multi-core fiber cable having a plurality of individual strands of fiber cable, the enclosure comprising:
   a shell defining an interior volume, the shell including an upper retention member forming a channel; and
   a retention bracket adapted to be at least partially disposed within the interior volume of the shell, the retention bracket including:
      a base panel including a front surface and a rear surface, the rear surface having an upper hook member adapted to engage the upper retention member of the shell to slidably couple the retention bracket with the shell, the front surface having a first guide wall and a second guide wall spaced apart from the first guide wall, the first guide wall and the second guide wall each including a curved contact surface and defining a slack storage ring, the plurality of individual strands of fiber cable adapted to wrap around the first guide wall and the second guide wall, and
      a floor panel extending from the base panel, the floor panel including a plurality of openings, each of the plurality of openings dimensioned to receive one of the plurality of individual strands of fiber cable.

2. The enclosure of claim 1, wherein the shell further includes a lower retention member forming a channel, the base panel of the retention bracket further including a lower hook member adapted to engage the lower retention member of the shell to slidably couple the retention bracket with the shell.

3. The enclosure of claim 1, wherein the shell further includes an inlet dimensioned to accommodate the multi-core fiber cable.

4. The enclosure of claim 1, wherein the shell further includes a plurality of outlets, each of the plurality of outlets dimensioned to accommodate one of the plurality of individual strands of fiber cable.

5. The enclosure of claim 1, further comprising a ledge operably coupled with the first guide wall, the ledge cooperating with the front surface of the base panel to define a channel.

6. The enclosure of claim 1, wherein the front surface of the base panel further includes a second guide wall spaced apart from the first guide wall, the plurality of individual strands of fiber cable adapted to wrap around the first guide wall and the second guide wall.

7. The enclosure of claim 6, wherein the first guide wall and the second guide wall are spaced apart from each other to define a slack storage ring.

8. The enclosure of claim 7, wherein the slack storage ring has a minimum bend radius of greater than approximately 3".

9. The enclosure of claim 1, wherein each of the plurality of openings is dimensioned to receive a connector adapted to couple each of the plurality of individual strands of fiber cable with a single strand fiber cable.

10. The enclosure of claim 1, wherein the base panel of the retention bracket further includes at least one pass through to receive a retention member to secure the plurality of individual strands of fiber cable therewith.

11. The enclosure of claim 1, wherein the shell further includes a guide member adapted to receive a portion of the multi-core fiber cable.

12. The enclosure of claim 1, wherein the upper hook member of the base panel includes a stop member to limit lateral movement of the retention bracket relative to the upper retention member.

13. The enclosure of claim 1, further comprising at least one supporting buttress extending between the base panel and the floor panel.

14. A retention bracket adapted for use in an enclosure for retaining a multi-core fiber cable having a plurality of individual fiber strands, the retention bracket comprising:

a base panel having a front surface and a rear surface, the rear surface including an upper hook member adapted to slidably engage a corresponding complementary component of a fiber cable enclosure;

a first guide wall and a second guide wall positioned on the front surface of the base panel spaced apart from the first guide wall, the first guide wall and the second guide wall each including a curved contact surface and defining a slack storage ring adapted to accommodate the length of the plurality of individual fiber strands wrapped around both guide walls; and a floor panel extending outwardly from the base panel, the floor panel including a plurality of openings, each opening dimensioned to individually receive one of the plurality of individual fiber strands therethrough.

15. The retention bracket of claim 14, further comprising a ledge coupled to the first guide wall, wherein the ledge and the front surface of the base panel cooperatively define a channel dimensioned to retain the plurality of individual fiber strands.

16. The retention bracket of claim 14, further comprising a second guide wall positioned on the front surface of the base panel spaced apart from the first guide wall, wherein the first guide wall and the second guide wall are adapted such that the plurality of individual fiber strands wrap around both guide walls.

17. The retention bracket of claim 16, wherein the first guide wall and the second guide wall are spaced to define a slack storage ring.

18. The retention bracket of claim 14, wherein each of the plurality of openings in the floor panel is dimensioned to receive a connector that couples each of the plurality of individual fiber strands with a respective single strand fiber cable.

\* \* \* \* \*